(12) United States Patent
Chang et al.

(10) Patent No.: US 11,132,926 B2
(45) Date of Patent: Sep. 28, 2021

(54) DISPLAY CONTROL METHOD AND APPARATUS

(71) Applicant: BEIJING XIAOMI MOBILE SOFTWARE CO., LTD., Beijing (CN)

(72) Inventors: Qun Chang, Beijing (CN); Changming Mo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/826,218

(22) Filed: Mar. 21, 2020

(65) Prior Publication Data
US 2020/0312241 A1 Oct. 1, 2020

(30) Foreign Application Priority Data

Mar. 29, 2019 (CN) .......................... 201910248420.4

(51) Int. Cl.
*G09G 3/00* (2006.01)
*G06F 3/0488* (2013.01)
*G06F 3/0482* (2013.01)
*G09G 5/14* (2006.01)

(52) U.S. Cl.
CPC .......... *G09G 3/035* (2020.08); *G06F 3/0482* (2013.01); *G06F 3/0488* (2013.01); *G09G 5/14* (2013.01); *G06F 2203/04803* (2013.01); *G09G 2354/00* (2013.01); *G09G 2380/02* (2013.01)

(58) Field of Classification Search
CPC .......... G06F 3/048–04897; G06F 2203/04803; G09G 3/035; G09G 5/14; G09G 2380/02
See application file for complete search history.

(56) References Cited

U.S. PATENT DOCUMENTS

| 9,104,376 | B2* | 8/2015 | Song ..................... G06F 1/3206 |
| 9,703,323 | B2* | 7/2017 | Song ..................... G06F 1/3206 |
| 9,734,779 | B2* | 8/2017 | Forutanpour ........ G09G 3/3644 |
| 9,747,015 | B2* | 8/2017 | Forutanpour ......... G06F 3/0412 |
| 9,842,190 | B2* | 12/2017 | Carlsen ................ G06F 3/0481 |
| 9,946,428 | B2* | 4/2018 | Akolkar ................ G06F 16/957 |
| 10,528,245 | B2* | 1/2020 | Mischke ............. G06F 3/04817 |

(Continued)

FOREIGN PATENT DOCUMENTS

| EP | 2570906 A2 | 3/2013 |
| EP | 3279763 A1 | 2/2018 |

(Continued)

OTHER PUBLICATIONS

Extended European search report of counterpart EP application No. 20165932.3 dated Jul. 28, 2020.

*Primary Examiner* — Gene W Lee
(74) *Attorney, Agent, or Firm* — Syncoda LLC; Feng Ma

(57) ABSTRACT

A display control method is applied to a mobile terminal having a foldable display screen, wherein the display screen includes n display regions, where n is a positive integer of not less than 2. The method includes: identifying multimedia elements currently displayed in a first display region; filtering the identified multimedia elements to obtain a target multimedia element; and displaying the target multimedia element in a second display region. In the embodiments of the present disclosure, through effective display control on the n display regions of the display screen, the multimedia elements can be flexibly displayed among the n display regions.

17 Claims, 10 Drawing Sheets

(56) References Cited

U.S. PATENT DOCUMENTS

| | | | |
|---|---|---|---|
| 10,860,194 B2* | 12/2020 | Strinden | G06F 40/58 |
| 2015/0331572 A1* | 11/2015 | Mischke | G06F 3/04817 |
| | | | 715/769 |
| 2016/0210371 A1* | 7/2016 | Akolkar | G06F 3/013 |
| 2016/0239091 A1* | 8/2016 | Forutanpour | G06F 1/1641 |
| 2016/0378270 A1 | 12/2016 | Lee et al. | |
| 2017/0371534 A1* | 12/2017 | Baumecker | G06F 3/0482 |
| 2019/0212877 A1* | 7/2019 | Sipko | G06F 1/1618 |
| 2020/0249898 A1* | 8/2020 | Ko | G06F 3/04886 |

FOREIGN PATENT DOCUMENTS

| | | | | |
|---|---|---|---|---|
| WO | 2015059342 A1 | 4/2015 | | |
| WO | WO-2020034121 A1 * | 2/2020 | | G06F 3/048 |

* cited by examiner

DISPLAY CONTROL METHOD AND APPARATUS

CROSS-REFERENCE TO RELATED APPLICATION

The present application claims priority to Chinese Patent Application No. 201910248420.4 filed on Mar. 29, 2019, the disclosure of which is hereby incorporated by reference in its entirety.

BACKGROUND

With the rapid development of display screen technologies, a foldable flexible display screen has now emerged and may be equipped in mobile terminals. When such a flexible display screen of a mobile terminal is in a folded status, the space occupied by the terminal can be reduced. When the flexible display screen is in an unfolded status, the terminal can provide a larger usable display area for the user. As such, the user experience can be improved

SUMMARY

The present disclosure relates to the field of mobile terminal technologies, and more specifically to a display control method and apparatus of a display screen and a storage medium.

Various embodiments of the present disclosure provide a display control method and apparatus of a display screen and a storage medium, which can improve user experience.

According to a first aspect of the present disclosure, a display control method of a display screen is provided, wherein the method is applied to a mobile terminal having a foldable display screen, the display screen includes n display regions, n is a positive integer of not less than 2, and the method includes:
 identifying multimedia elements currently displayed in a first display region;
 filtering the identified multimedia elements to obtain a target multimedia element; and
 displaying the target multimedia element in a second display region.

According to a second aspect of the present disclosure, a display control apparatus of a display screen is provided, wherein the apparatus is applied to a mobile terminal having a foldable display screen, the display screen including n display regions, n is a positive integer of not less than 2, and the apparatus includes:
 a processor; and
 a memory for storing a processor-executable instruction, wherein
 the processor is configured to: identify multimedia elements currently displayed in a first display region; filter the identified multimedia elements to obtain a target multimedia element; and display the target multimedia element in a second display region.

According to a third aspect of the present disclosure, a storage medium having stored therein a computer program instruction is provided, which, when being executed by a processor, implements the following steps: identifying multimedia elements currently displayed in a first display region; filtering the identified multimedia elements to obtain a target multimedia element; and displaying the target multimedia element in a second display region.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this disclosure, illustrate embodiments consistent with the present disclosure and, together with the specification, serve to explain the principles of the present disclosure.

DETAILED DESCRIPTION

Some embodiments will be described in detail herein, examples of which are illustrated by the accompanying drawings. The following description refers to the accompanying drawings in which the same numbers in different drawings represent the same or similar elements unless otherwise indicated. The implementations set forth in the following embodiments do not represent all implementations consistent with the present invention. Rather, they are merely examples of devices and methods consistent with certain aspects of the present disclosure as detailed in the appended claims.

Before making a detailed explanation on the embodiments of the present disclosure, the structure of a mobile terminal is explained first.

The mobile terminal be a device such as a mobile phone or a tablet computer, and is provided with a foldable display which is also referred to as a foldable display screen. The foldable display screen has a display function, as well as the characteristic of foldability. In the embodiments of the present disclosure, the foldable display screen at least may include two screen statuses which include a folded status and an unfolded status. When the foldable display screen is in the folded status, a space occupied by the terminal can be reduced, and when the foldable display screen is in the unfolded status, it can provide a larger usable display area for the user.

Various embodiments of the present disclosure provide a new mode of experience based on such novel display screen, for example by performing brand-new display control on such novel display screen, to assist the user in using the mobile terminal more conveniently and guide the user to experience the convenience and new experience brought by science and technology.

In some embodiments of the present disclosure, through effective display control on the n display regions of the display screen, the multimedia elements can be flexibly displayed among the n display regions. As such, the various display regions of the mobile terminal are effectively used and a brand-new display control on a novel display screen is achieved, which can assist users in using the mobile terminal more conveniently and bring great convenience and new experience to the users.

In some embodiments of the present disclosure, the display screen of the mobile terminal includes n display areas, and n is a positive integer of not less than 2.

As an example, the value of n may be 2. That is, the foldable display screen includes two foldable display areas.

In this case, the display screen may be designed as a left-right foldable display screen or an up-down foldable display screen, or may be designed as an outward foldable display screen or an inward foldable display screen. This is not specifically limited in the embodiments of the present disclosure.

Instructions on the structure are made by taking the display screen of the mobile terminal as the left-right foldable display screen as an example.

Figure 1:
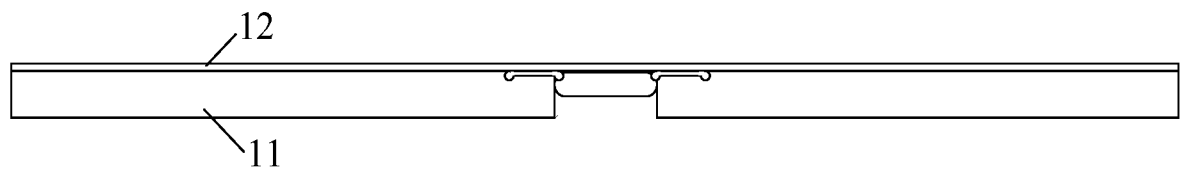
FIG. 1 is a schematic structural diagram of a mobile terminal according to some embodiments of the present disclosure.

FIG. 1 is a schematic structural diagram of a mobile terminal in accordance with some embodiments of the present disclosure. Referring to FIG. 1, the mobile terminal includes a housing 11 and a display screen 12. One side of the display screen 12 is attached to the housing 11, and the other side is configured for display. The housing 11 is a foldable housing.

In some implementations, a rotating shaft is disposed in the middle of the housing 11. The housing on either side is rotatable about the rotating shaft to control the housing 11 to be folded or unfolded and to drive the display screen 12 to be folded or unfolded.

In some implementations, the display screen 12, which may be a one-piece flexible display screen made of a flexible material, such as plastic, a metal foil or other materials, is a bendable and deformable display component and can be unfolded or folded as the housing 11.

Figure 2:
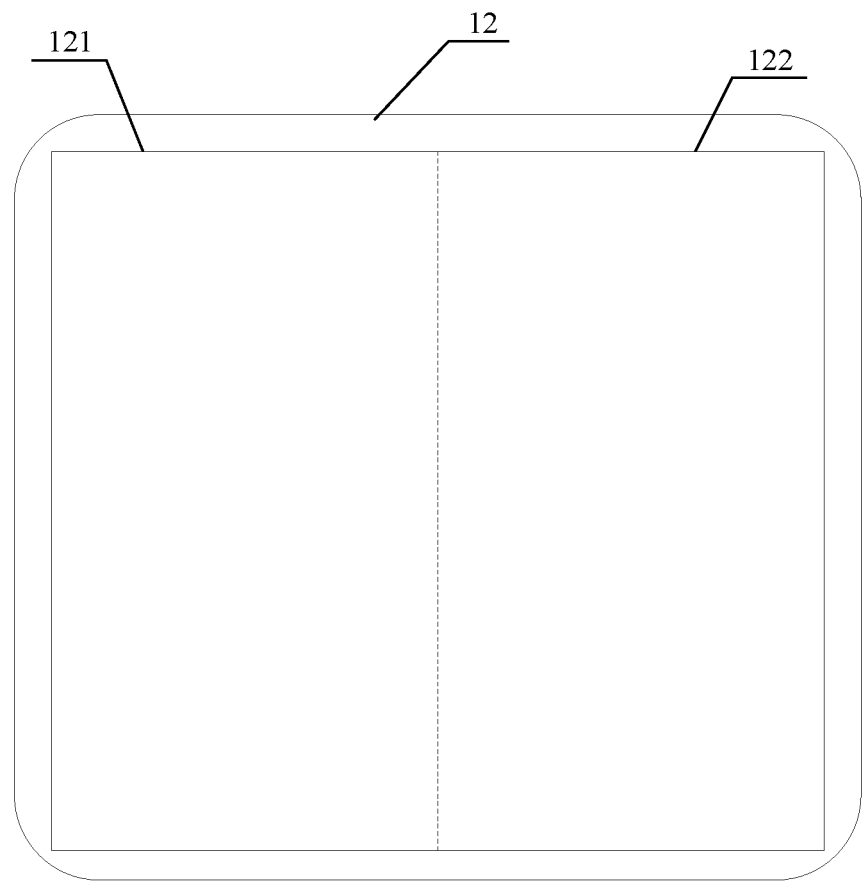
FIG. 2 is a schematic structural diagram of another mobile terminal according to some embodiments of the present disclosure.

As shown in FIG. 2, the display screen 12, which is a one-piece flexible display screen, can be divided into a first display area 121 and a second display area 122, and the two areas may have the same size, or have different sizes. This is not specifically limited in the embodiments of the present disclosure.

Figure 3:
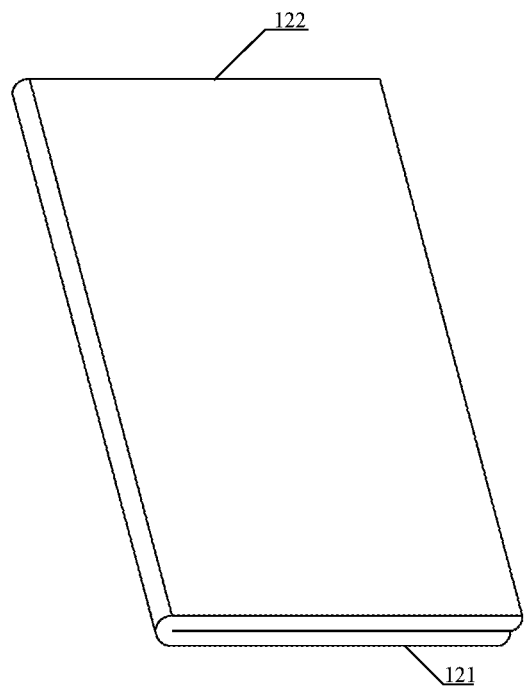
FIG. 3 is a schematic structural diagram of yet another mobile terminal according to some embodiments of the present disclosure.

As an example, referring to FIG. 3, the first display area 121 and the second display area 122 are in the same size. When the display screen 12 is in the folded status, one display area is on top (namely, facing the user), and the other display area is at bottom (namely, backing onto the user). That is, in the folded status, the first display area 121 and the second display area 122 are parallel to each other with the front sides of the two display areas being in opposite directions. Here, the front side means a side for displaying a user interface.

Similarly, as shown in FIG. 2, the unfolded status refers to a status in which the first display area 121 and the second display area 122 are unfolded into the same plane, with the front sides of the two display areas being in the same direction.

Figure 4:
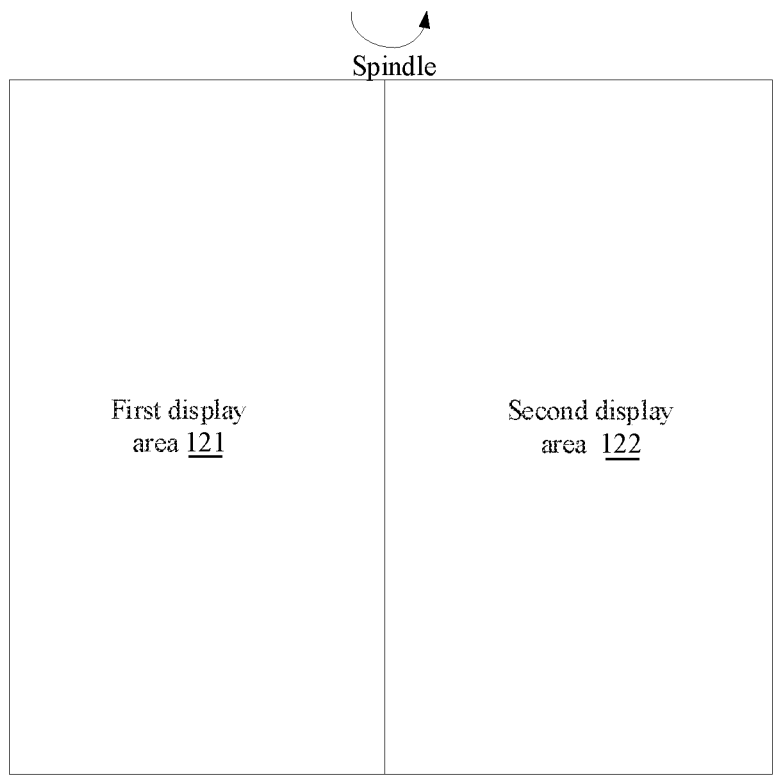
FIG. 4 is a schematic structural diagram of yet another mobile terminal according to some embodiments of the present disclosure.

In some implementations, as shown in FIG. 4, the display screen 12 may be folded outwards. Functional modules such as a camera and a flashlight can be disposed in the second display area 122 depending on the folding direction. This is not specifically limited in the embodiments of the present disclosure.

As another example, the value of n may be 3. That is, the foldable display screen may include three foldable display areas. In some implementations, the three display areas include one main screen and two auxiliary screens.

In this case, the display screen of the mobile terminal may be designed as a left-right foldable display screen or an up-down foldable display screen, or may be designed as an outward foldable display screen or an inward foldable display screen. This is not specifically limited in the embodiments of the present disclosure.

Figure 5:
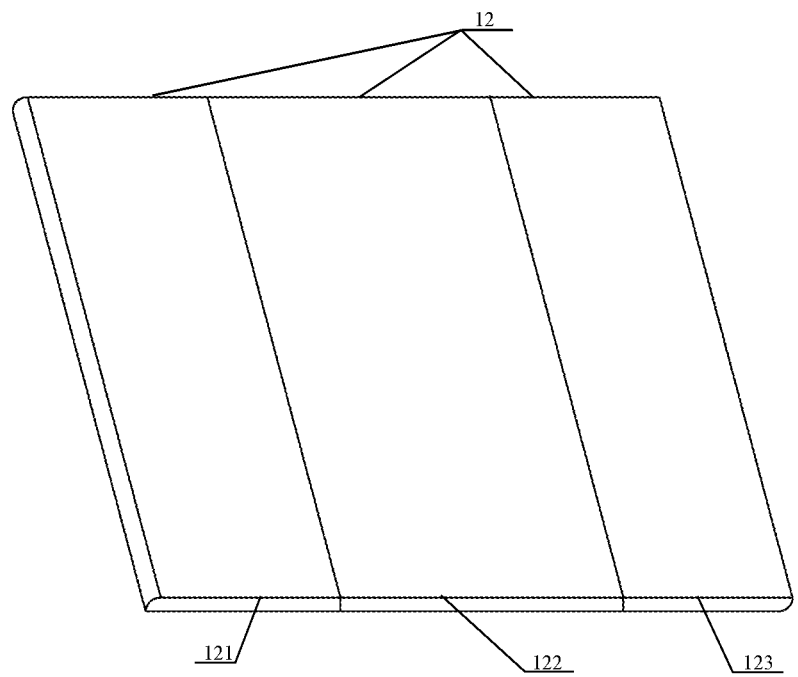
FIG. 5 is a schematic structural diagram of yet another mobile terminal according to some embodiments of the present disclosure.

Taking the display screen of the mobile terminal being designed as a left-right foldable display screen as a first example, as shown in FIG. 5, the display screen 12, which is a one-piece flexible display screen, can be divided into three display areas, namely one main screen 121, a first auxiliary screen 122 and a second auxiliary screen 123.

In this case, the screen statuses include a folded status, an unfolded status and a semi-unfolded status. That is, the display screen 12 may be in any one of the folded status, the unfolded status and the semi-unfolded status.

Figure 6:
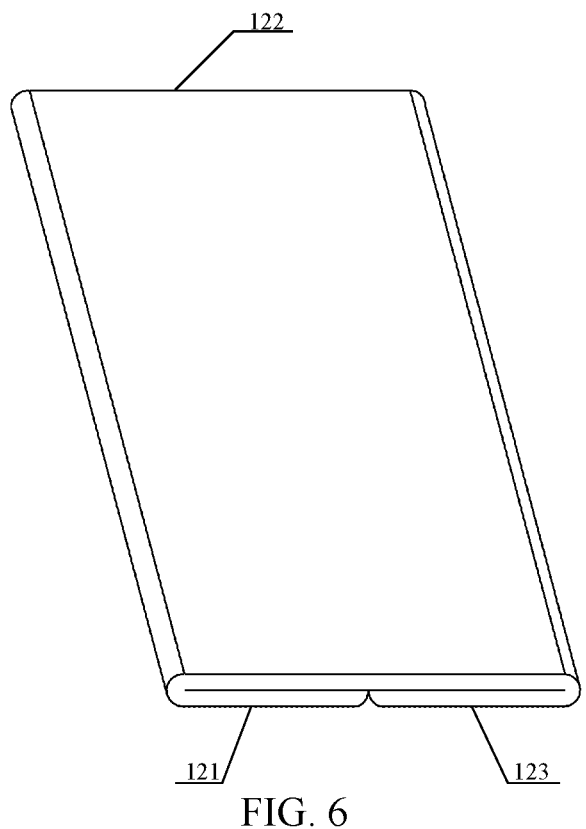
FIG. 6 is a schematic structural diagram of yet another mobile terminal according to some embodiments of the present disclosure.

Exemplarily, as shown in FIG. 6, in the folded status, the main screen 121, the first auxiliary screen 122 and the second auxiliary screen 123 are all parallel, and the front sides of the first auxiliary screen 122 and the second auxiliary screen 123 are in opposite directions from that of the main screen 121.

Exemplarily, as shown in FIG. 5, the unfolded status refers to a status in which the main screen 121, the first auxiliary screen 122, and the second auxiliary screen 123 are on the same plane, and the front sides of the first auxiliary screen 122 and the second auxiliary screen 123 are in the same direction as that of the main screen 121.

Figure 7:
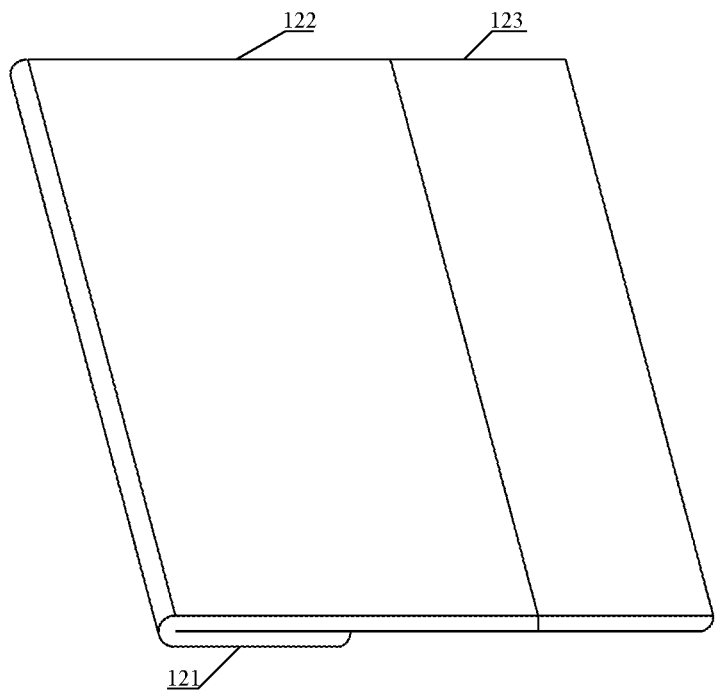
FIG. 7 is a schematic structural diagram of yet another mobile terminal according to some embodiments of the present disclosure.

Exemplarily, as shown in FIG. 7, the semi-unfolded status refers to a status between the folded status and the unfolded status, that is, one of the two auxiliary screens is in an unfolded status while the other auxiliary screen is in a folded status. At this time, the main screen 121 is on the same plane as one of the auxiliary screens (such as the first auxiliary screen 122 or the second auxiliary screen 123), the front side of the main screen 121 is in the same direction as that of this auxiliary screen, and the front side of the main screen 121 is in an opposite direction from that of the other auxiliary screen.

Figure 8:
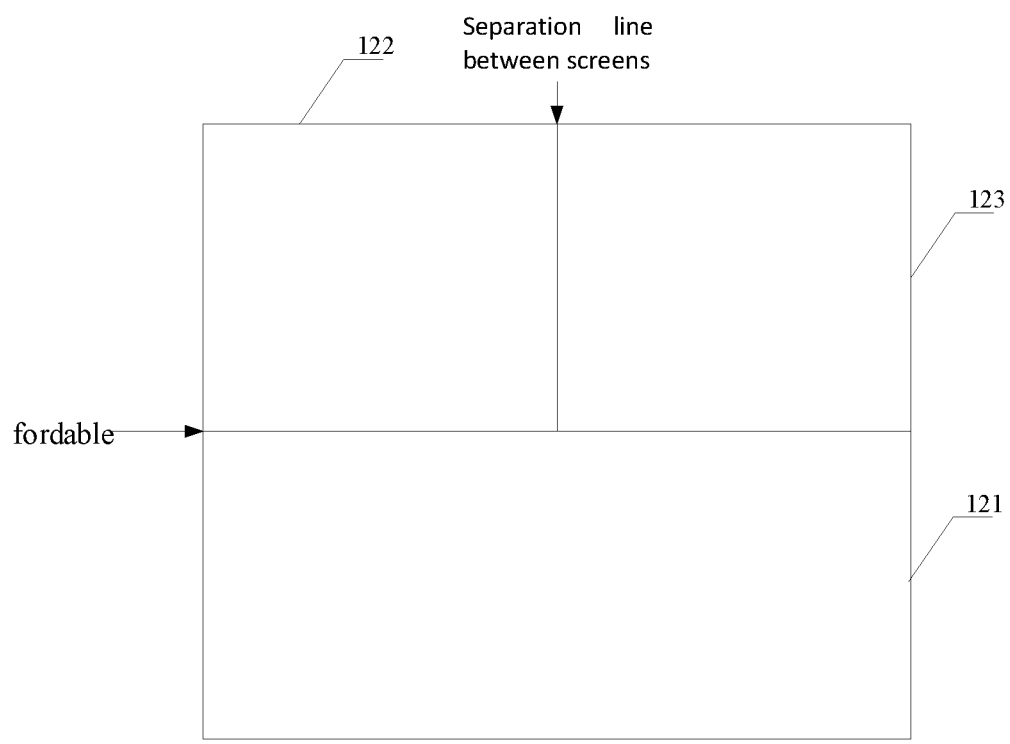
FIG. 8 is a schematic structural diagram of yet another mobile terminal according to some embodiments of the present disclosure.

Taking the display screen of the mobile terminal being designed as an up-down foldable display screen as a second example, FIG. 8 is a schematic structural diagram of another mobile terminal in an unfolded status.

Referring to FIG. 8, the display screen 12 includes a main screen 121, a first auxiliary screen 122, and a second auxiliary screen 123 which may also be referred to as a first display area, a second display area, and a third display area respectively.

In some implementations, the three display areas described above may be an integrated structure. That is, the first display area, the second display area, and the third display area may be obtained by dividing one entire display screen into areas. In this case, in the folded status, both of the second display area and the third display area may be attached to the first display area.

In some other implementations, the second display area and the third display area may be separate structures. In this case, it can be select to only make the second display area or the third display area contact the first display area.

Exemplarily, the size of the first display area equals to the sum of the size of the second display area and the size of the third display area. Exemplarily, when the display screen 12 is in the folded status, the first display area may face upward (i.e., facing the user), while the second display area and the third display area may face downward (i.e., backing onto the user). This is not specifically limited in the embodiments of the present disclosure.

It should be noted that the display screen of the mobile terminal may also be divided into more display areas in a similar way as described above. This is not specifically limited in the embodiments of the present disclosure.

Figure 9:
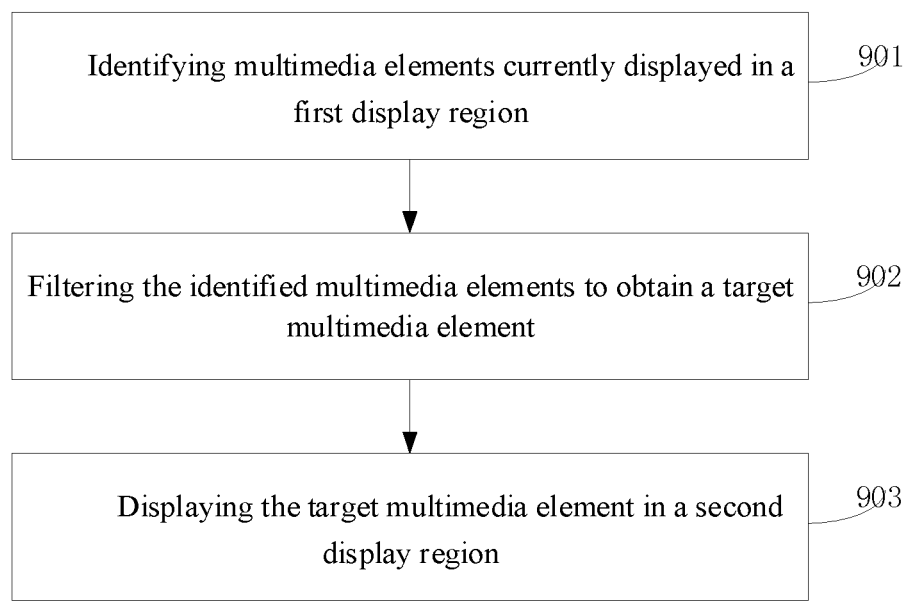
FIG. 9 is a flowchart of a display control method of a display screen according to some embodiments of the present disclosure.

FIG. 9 is a flowchart of a display control method of a display screen according to some embodiments of the present disclosure. As shown in FIG. 9, the method is applied to a mobile terminal having a foldable display screen, wherein the display screen includes n display regions, where n is a positive integer of not less than 2. The method includes the following steps.

Step 301 includes identifying multimedia elements currently displayed in a first display region.

Step 302 includes filtering the identified multimedia elements to obtain a target multimedia element.

Step 303 includes displaying the target multimedia element in a second display region.

In the methods provided by the embodiments of the present disclosure, through effective display control on the n display regions of the display screen, the multimedia elements can be flexibly displayed among the n display regions. As such, the various display regions of the mobile terminal are effectively used and a brand-new display control on a novel display screen is achieved, which can assist users in using the mobile terminal more conveniently and bring great convenience and new experience to the users.

In some implementations, n is 3 and the method further includes:
  displaying, in response to a first content viewing instruction for a first multimedia element received in the second display region, the first multimedia element in the first display region, wherein the first multimedia element is any multimedia element displayed in the second display region; and
  displaying a multimedia element, which is currently displayed in the first display region, in a third display region.

In some implementations, n is 3 and the method further includes:
  displaying, in response to a second content viewing instruction for a second multimedia element received in a third display region, the second multimedia element in the first display region, wherein the second multimedia element is any multimedia element displayed in the third display region; and
  displaying a multimedia element, which is currently displayed in the first display region, in a third display region.

In some implementations, the filtering the identified multimedia elements to obtain the target multimedia element includes:
  determining a type of each of the identified multimedia elements; and
  classifying, when a type of a third multimedia element is a target type, the third multimedia element as the target multimedia element, wherein the third multimedia element is any of the identified multimedia elements.

In some implementations, the filtering the identified multimedia elements to obtain the target multimedia element includes:
  acquiring user preference information; and
  filtering the identified multimedia elements according to the user preference information to obtain the target multimedia element.

In some implementations, the method further includes:
  performing, in response to a target-triggering operation acquired in the first display region, the steps of identifying multimedia elements currently displayed in the first display region, filtering the identified multimedia elements, and displaying a target multimedia element obtained by the filtering in the second display region.

The above-mentioned implementations can be combined in a number of different ways to form various embodiments of the present disclosure, which are not repeated herein.

Figure 10:
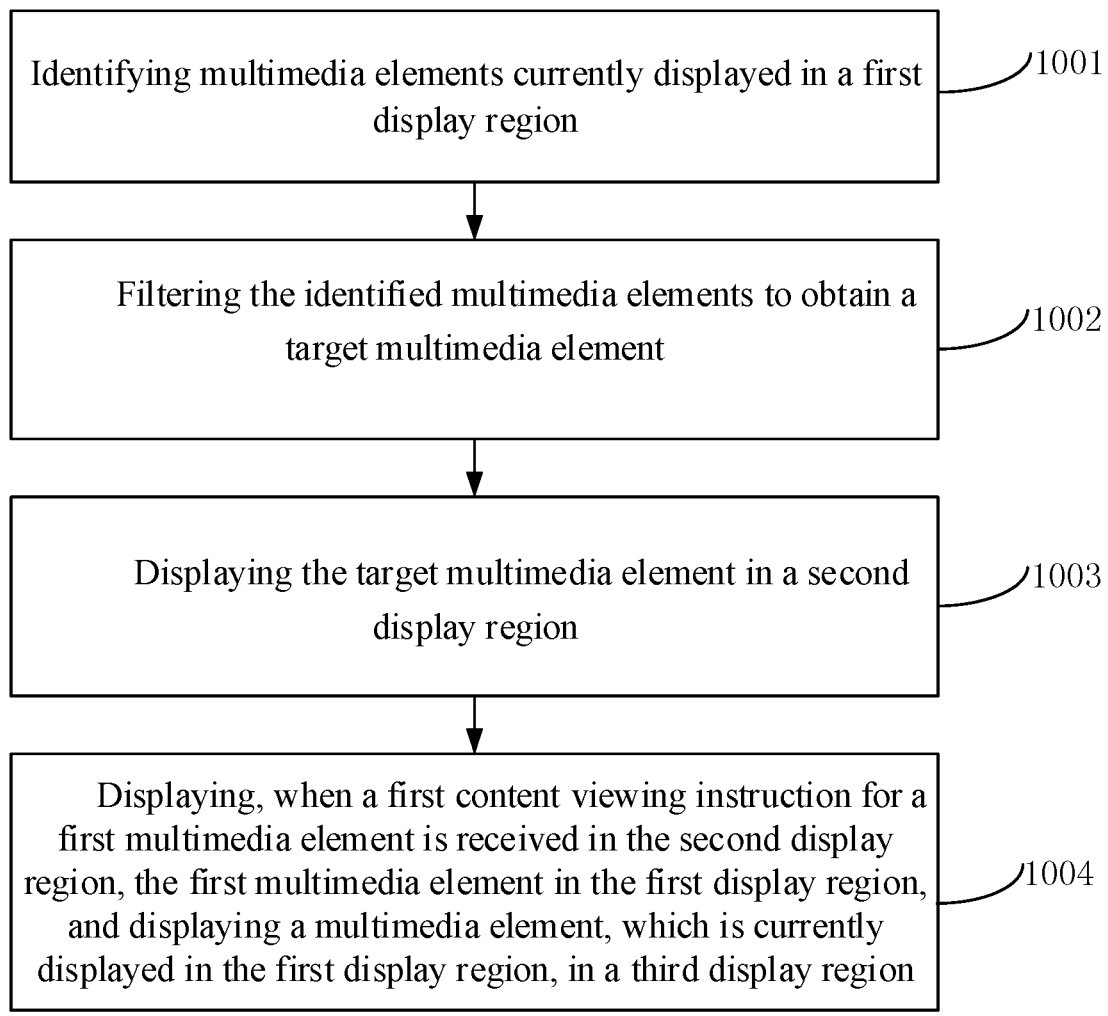
FIG. 10 is a flowchart of a display control method of a display screen according to some embodiments of the present disclosure.

FIG. 10 is a flowchart of a display control method of a display screen according to some embodiments of the present disclosure. As shown in FIG. 10, the method is applied to a mobile terminal having a foldable display screen, wherein the display screen includes n display regions, where n is a positive integer of not less than 2. Taking n being equal to 3 as an example, the method includes the following steps.

Step 1001 includes identifying multimedia elements currently displayed in a first display region.

In the embodiment of the present disclosure, the first display region is also known as a main operation screen, the second display region is also known as an identification presentation screen, and the third display region is also known as a temporary saving screen.

The above multimedia elements may generally refer to contents displayed in the first display region, that is, an identification range is the entire screen. The types of the multimedia elements include, but are not limited to, text, a picture, a link, a pop-up message, audio, a video and the like, which is not specifically limited in the embodiment of the present disclosure. Exemplarily, if one web page is currently displayed in the first display region, the multimedia elements may include web page text, a web page picture, a pop-up message, a web page link and the like.

In some implementations, the range for the mobile terminal to identify the multimedia elements may also be based on an identification range selected by the user, for example, the mobile terminal may provide a region selection box for the user to determine the identification range; or the mobile terminal may automatically determine the identification range according to a touch control operation executed by the user in the first display region, which is not specifically limited in the embodiment of the present disclosure.

In some implementations, the display control method of the display screen according to the embodiment of the present disclosure may be initiated based on an active triggering operation of the user. That is, after acquiring a target-triggering operation in the first display region, the mobile terminal performs the steps of identifying multimedia elements currently displayed in the first display region, filtering the identified multimedia elements, and displaying the target multimedia element obtained by the filtering in the second display region. Here, the target-triggering operation may be a specific gesture operation or a triggering operation on a particular virtual key, which is not specifically limited in the embodiment of the present disclosure.

Exemplarily, by taking the particular virtual key as an example, the particular virtual key may be a switch for enabling a display control function. Here, a display position of this particular virtual key may be a system setting interface, which is not specifically limited in the embodiment of the present disclosure. When the mobile terminal receives a triggering instruction from the user on the particular virtual key, namely, after the user turns on the switch, the mobile terminal will enter a display control state. Here, the particular triggering instruction may be a click operation of the user on the particular virtual key, which is likewise not specifically limited in the embodiment of the present disclosure.

In the embodiment of the present disclosure, the manner for identifying the multimedia elements in the first display region includes, but is not limited to the following manners: a screen-capturing operation is preformed constantly on the first display region, and then the captured screen images are subject to an image-recognition, thereby identifying the multimedia elements currently displayed in the first display region.

Step 1002 includes filtering the identified multimedia elements to obtain a target multimedia element.

In the embodiment of the present disclosure, after identifying the screen content of the first display region, the mobile terminal may obtain a plurality of multimedia elements. Since, on the one hand, the user may be only interested in some of the identified multimedia element, and on the other hand, the second display region cannot contain all the identified multimedia elements due to size limitation, the embodiment of the present disclosure further includes the step of filtering the identified multimedia elements.

Here, the multimedia element after being filtered is referred to as a target multimedia element herein. In some implementations, the manner of filtering the identified multimedia elements includes, but is not limited to the following two manners.

In a first manner, the type of each of the identified multimedia elements is determined; and when the type of a third multimedia element is a target type, the third multimedia element is classified as the target multimedia element. Here, the third multimedia element is any of the identified multimedia elements.

Types of the multimedia elements include, but are not limited to, text, a picture, audio, a video and the like, which is not specifically limited in the embodiment of the present disclosure. Exemplarily, the target type may be the text and picture. That is, when any multimedia element in the identified multimedia elements is the text or picture, this multimedia element is classified as content required to be displayed in the second display region, i.e., classified as the target multimedia element.

In a second manner, user preference information is acquired, and the identified multimedia elements are filtered according to the user preference information to obtain the target multimedia element.

This manner aims to identify content, which may be of interest to the user, among the identified multiple multimedia elements. Here, the acquiring manners of the user preference information include, but are not limited to the followings.

The user preference information may be obtained according to statistics on historical information of the user, wherein the historical information may include a historical browsing record, a historical watching record, a historical searching record, a historical favorite record, a historical sharing record, a historical downloading record and the like, which is not specifically limited in the embodiment of the present disclosure. Or, the user preference information may be deduced from attribute information of the user, wherein the attribute information may include a geographical position, age, sex, the type of work and the like, which is not specifically limited in the embodiment of the present disclosure.

Step 1003 includes displaying the target multimedia element in a second display region.

Figure 11:
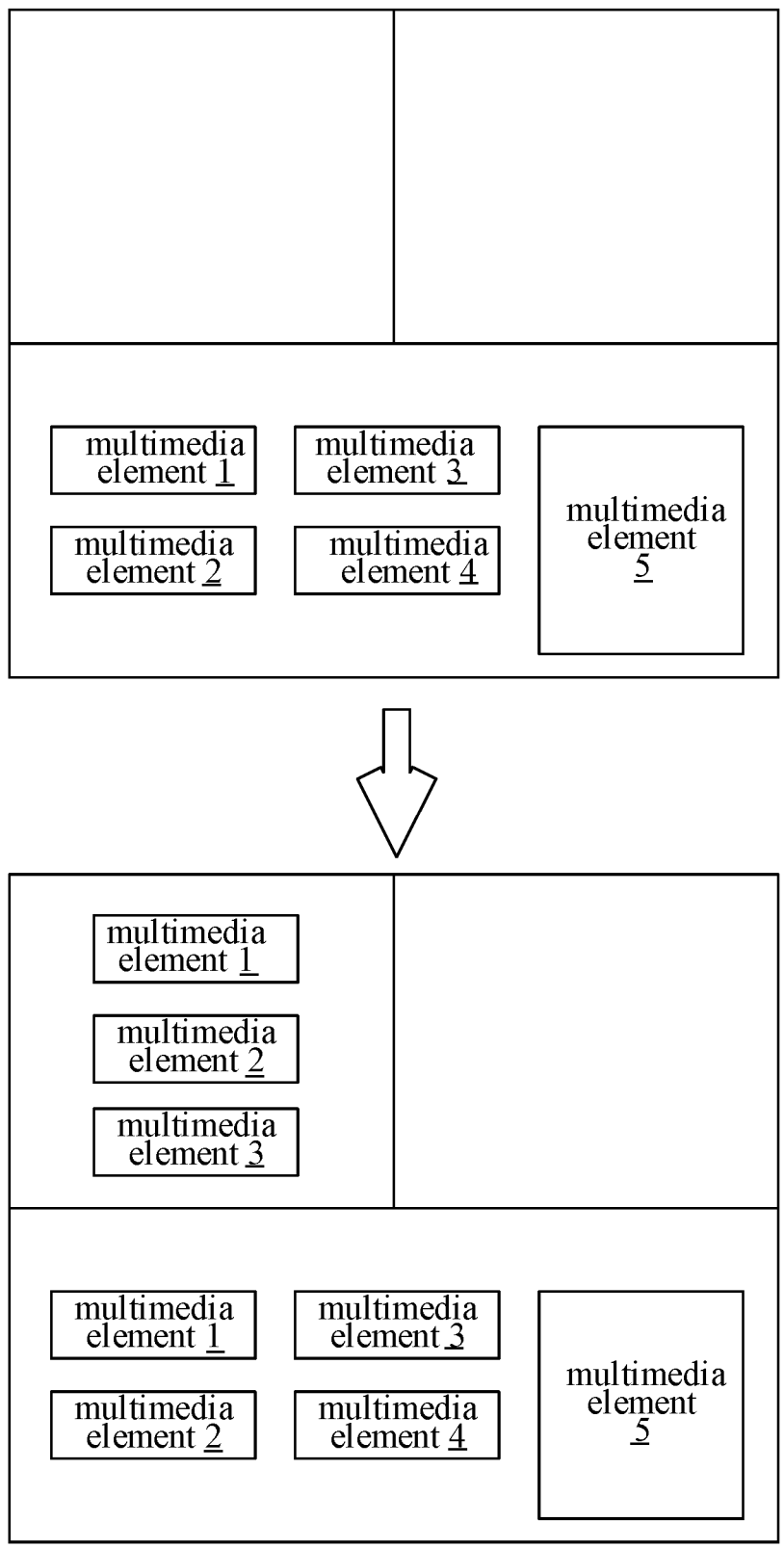
FIG. 11 is a schematic display diagram of a first display screen according to some embodiments of the present disclosure.

With reference to FIG. 11, at this time, the multimedia elements currently displayed in the first display region have been transferred to and displayed on the second display region. In the embodiment of the present disclosure, when there are a large number of target multimedia elements, the target multimedia elements may be displayed in the second display region in the form of a list.

In addition, in order to occupy less screen space, abbreviation forms of the various multimedia elements may be displayed in the second display region, which is not specifically limited in the embodiment of the present disclosure.

It should be noted that steps 1001-1003 above may be implemented on a mobile terminal having two display regions, which is not specifically limited in the embodiment of the present disclosure.

Step 1004 includes displaying, in response to a first content viewing instruction for a first multimedia element received in the second display region, the first multimedia element in the first display region and displaying a multimedia element, which is currently displayed in the first display region, in a third display region.

The first multimedia element is any multimedia element displayed in the second display region.

It should be noted that the expressions such as the first multimedia element, the second multimedia element, the third multimedia element and the like herein are merely used to distinguish the different multimedia elements, and do not constitute any other particular limitation on the multimedia elements.

Figure 12:
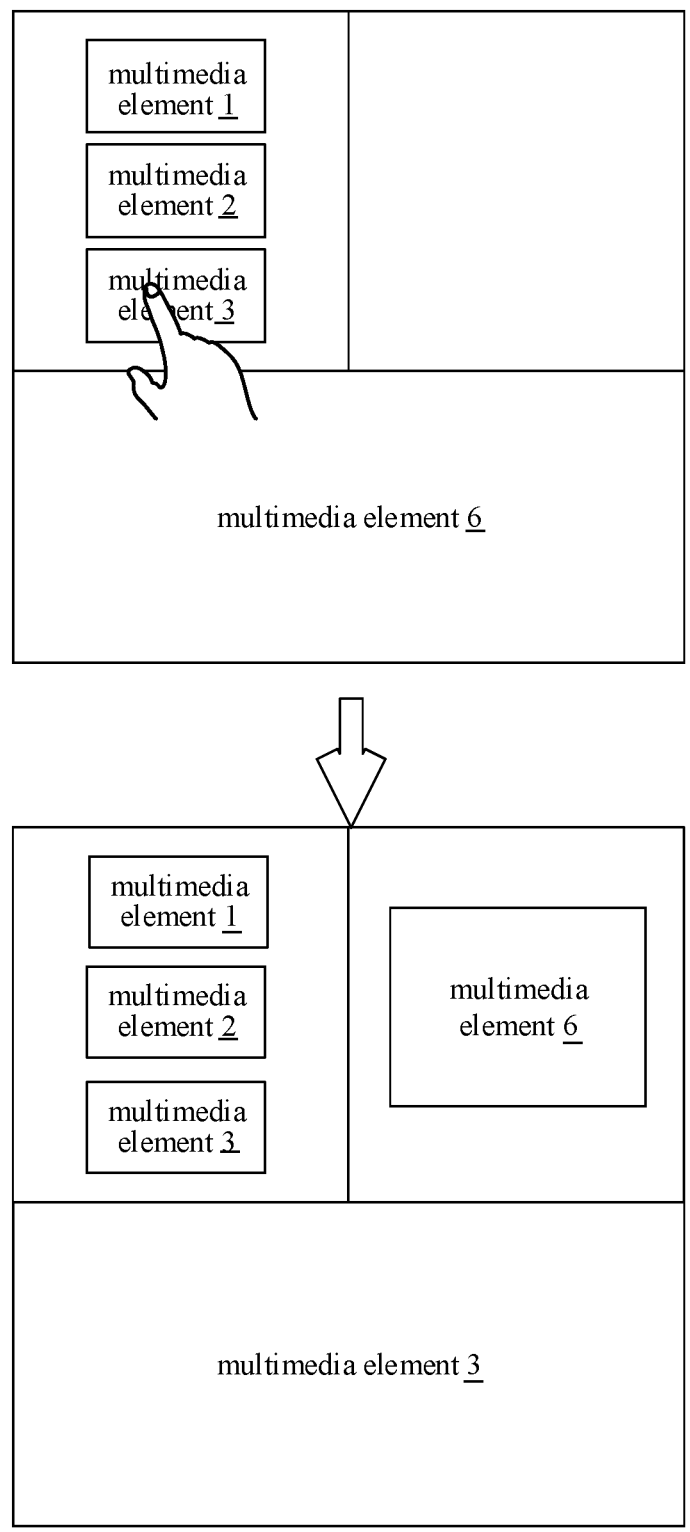
FIG. 12 is a schematic display diagram of a second display screen according to some embodiments of the present disclosure.

With reference to FIG. 12, after receiving a content viewing instruction with respect to any multimedia element in the second display region, i.e., the identification presentation screen, the mobile terminal will automatically display the detailed content of this multimedia element in the first display region, i.e., the main screen, and the content previously displayed in the first display region would have been automatically displayed in the third display region, i.e., the temporary saving screen, to conduct a temporary storage for the subsequent browsing or viewing of the user.

Here, depending on the various types of the first multimedia element, the display manner in which the first multimedia element is displayed in the first display region is different. Exemplarily, if the first multimedia element is a web page link, a web page corresponding to the web page link is displayed in the first display region. If the first multimedia element is a video link, a video-playing window corresponding to the video link is displayed in the first display region. If the first multimedia element is text or a picture or a combination thereof, the entire text content or the entire picture content is directly displayed in the first display region.

Exemplarily, the above first content viewing instruction may be generated in response to a click operation of the user on the first multimedia element, which is not specifically limited in the embodiment of the present disclosure.

In addition, after the first multimedia element is displayed in the first display region, the multimedia element identification will be continued in the first display region, i.e., the above step 401 will be repeatedly executed.

In some other implementations, the content in the temporary saving screen may also be displayed directly on the main operation screen, and the content previously displayed on the main operation screen would be transferred to and displayed on the temporary saving screen. That is, the method further includes: in response to a second content viewing instruction for a second multimedia element received in the third display region, the second multimedia element is displayed in the first display region, and a multimedia element currently displayed in the first display region is displayed in the third display region. Here, the second multimedia element is any multimedia element displayed in the third display region.

It should be noted that the expressions such as the first content viewing instruction, the second content viewing instruction and the like are merely used to distinguish different content viewing instructions, and do not constitute any particular limitation on the content viewing instructions.

Figure 13:
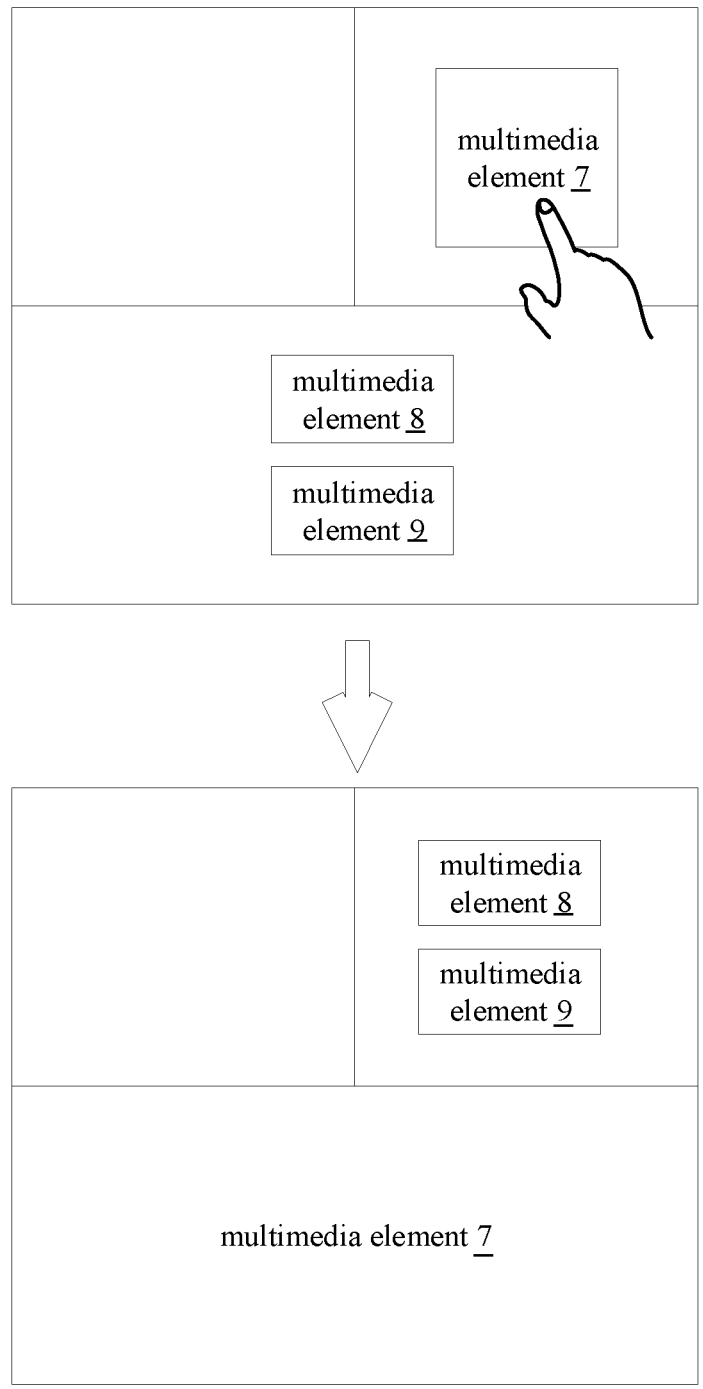
FIG. 13 is a schematic display diagram of a third display screen according to some embodiments of the present disclosure.

For this case, with reference to FIG. 13, after receiving a content viewing instruction for any multimedia element in the third display region, i.e., the temporary saving screen, the mobile terminal may also automatically display the detailed content of this multimedia element in the first display region, i.e., the main screen, and the content previously displayed in the first display region would be automatically displayed in the third display region, to conduct a temporary storage for a subsequent browsing or viewing of the user.

In summary, in the embodiment of the present disclosure, the various screens of a multi-screen terminal are effectively used, which can assist the user in acquiring more information more rapidly.

In the methods provided by the embodiments of the present disclosure, through effective display control on the n display regions of the display screen, the multimedia elements can be flexibly displayed among the n display regions. As such, the various display regions of the mobile terminal are effectively used and a brand-new display control on a novel display screen is achieved, which can assist users in using the mobile terminal more conveniently and bring great convenience and new experience to the users.

Figure 14:
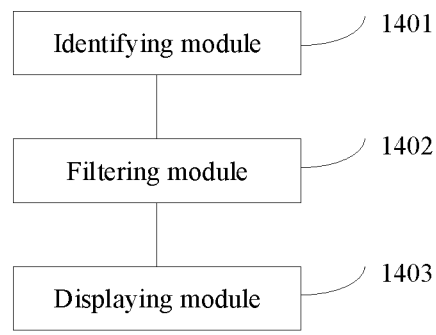
FIG. 14 is a block diagram of a display control apparatus of a display screen according to some embodiments of the present disclosure.

FIG. 14 is a block diagram of a display control apparatus of a display screen according to some embodiments of the present disclosure. The apparatus is applied to a mobile terminal having a foldable display screen, wherein display screen includes n display regions, where n is a positive integer of not less than 2. With reference to FIG. 14, the apparatus includes an identifying module 1401, a filtering module 1402 and a displaying module 1403.

The identifying module 1401 is configured to identify multimedia elements currently displayed in a first display region; the filtering module 1402 is configured to filter the identified multimedia elements to obtain a target multimedia element; and the displaying module 1403 is configured to display the target multimedia element in a second display region.

In the apparatuses provided by the embodiments of the present disclosure, through effective display control on the n display regions of the display screen, the multimedia elements can be flexibly displayed among the n display regions. As such, the various display regions of the mobile terminal are effectively used and a brand-new display control on a novel display screen is achieved, which can assist users in using the mobile terminal more conveniently and bring great convenience and new experience to the users.

In some implementations, the displaying module 1403 is further configured to: display, in response to a first content viewing instruction for a first multimedia element received in the second display region, the first multimedia element in the first display region, wherein the first multimedia element is any multimedia element displayed in the second display region; and display a multimedia element, which is currently displayed in the first display region, in the third display region.

In some implementations, the displaying module 1403 is further configured to: display, in response to a second content viewing instruction for a second multimedia element received in the third display region, the second multimedia element in the first display region, wherein the second multimedia element is any multimedia element displayed in the third display region; and display a multimedia element, which is currently displayed in the first display region, in the third display region.

In some implementations, the filtering module 1402 is further configured to: determine the type of each of the identified multimedia elements; and when the type of a third multimedia element is a target type, classify the third multimedia element as the target multimedia element, wherein the third multimedia element is any of the identified multimedia elements.

In some implementations, the filtering module 1402 is further configured to: acquire user preference information; and filter the identified multimedia elements according to the user preference information to obtain the target multimedia element.

In some implementations, the identifying module 1401 is further configured to: in response to a target-triggering operation acquired in the first display region, execute the step of identifying multimedia elements currently displayed in the first display region.

The above-mentioned implementations can be combined in many different ways to form various embodiments of the present disclosure, which are not repeated herein.

With regard to the apparatuses in the aforesaid embodiments, the specific implementations in which the respective modules perform operations have been described in detail in the related method embodiments, and are not repeated here.

Figure 15:
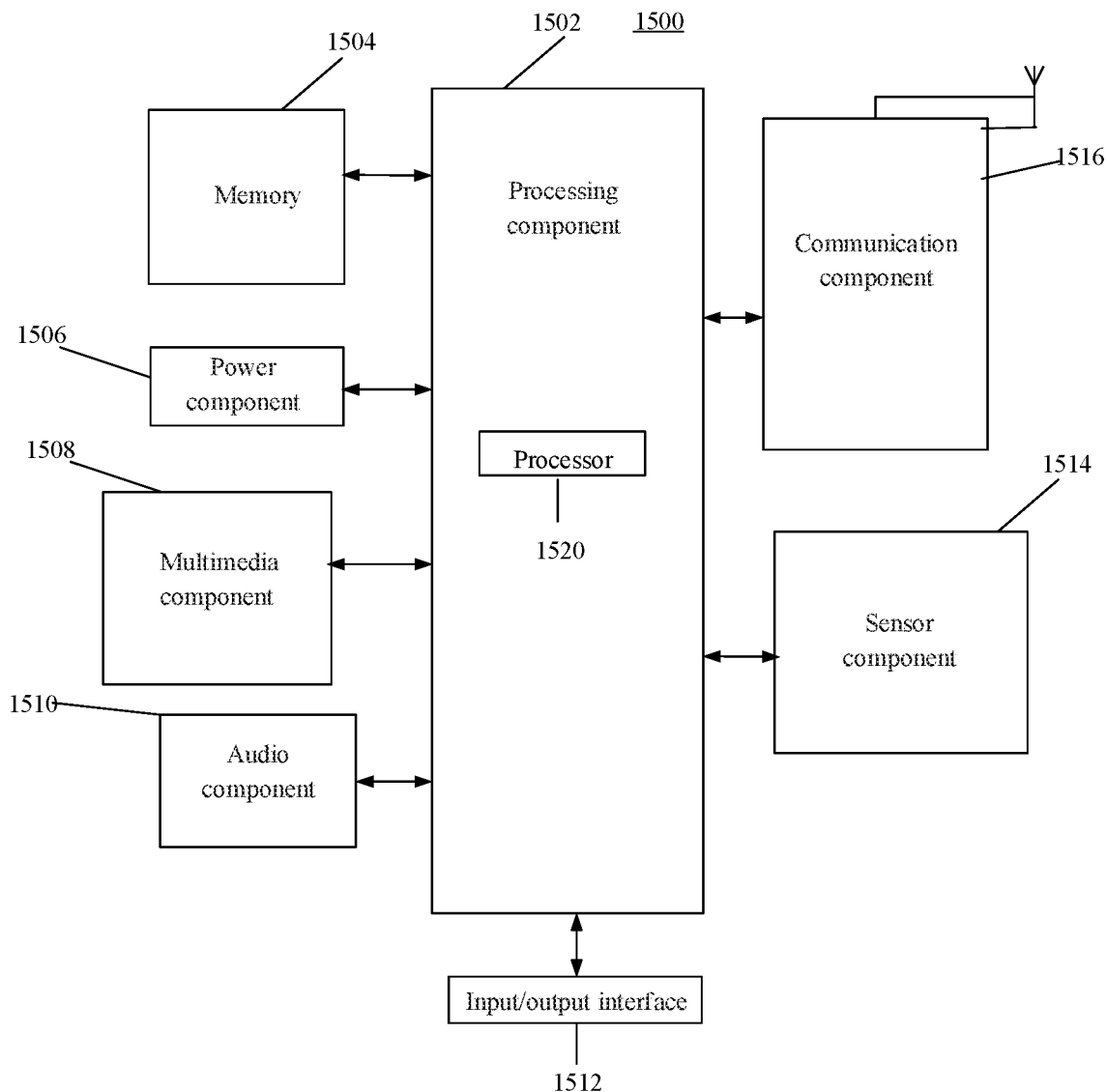
FIG. 15 is a block diagram of a display control apparatus of a display screen according to some embodiments of the present disclosure.

FIG. 15 is a block diagram of a display control apparatus 1500 of a display screen shown according to some embodiments of the present disclosure. For example, the apparatus 1500 may be a mobile phone, a computer, a digital broadcast terminal, a message transceiver device, a game console, a tablet device, a piece of medical equipment, a piece of fitness equipment, a personal digital assistant, and the like.

Referring to FIG. 15, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the apparatus 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the apparatus 1500. Examples of such data include instructions for any applications or methods operated on the apparatus 1500, contact data, phonebook data, messages, pictures, video, etc. The memory 1504 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 may include a power management system, one or more power sources, and any other components associated with the generation, management, and distribution of power in the apparatus 1500.

The multimedia component 1508 includes a screen providing an output interface between the apparatus 1500 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1508 includes a front camera and/or a rear camera. The front camera and the rear camera may receive an external multimedia datum while the apparatus 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone (MIC) configured to receive an external audio signal when the apparatus 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the apparatus 1500. For instance, the sensor component 1514 may detect an open/closed status of the apparatus 1500, relative positioning of components, e.g., the display and the keypad, of the apparatus 1500, a change in position of the apparatus 1500 or a component of the apparatus 1500, a presence or absence of user contact with the apparatus 1500, an orientation or an acceleration/deceleration of the apparatus 1500, and a change in temperature of the apparatus 1500. The sensor component 1514 may include a proximity sensor configured to detect the presence of nearby objects without any physical contact. The sensor component 1514 may also include a light sensor, such as a complementary metal oxide semiconductor (CMOS) or charge-coupled device (CCD) image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the apparatus 1500 and other devices. The apparatus 1500 can access a wireless network based on a communication standard, such as Wi-Fi, 2G, 3G, 4G, 5G, or a combination thereof. In some embodiments, the communication component 1516 receives a broadcast signal or broadcast associated information from an external broadcast management system via a broadcast channel. In some embodiments, the communication component 1516 further includes a near field communication (NFC) module to facilitate short-range communications.

In some embodiments, the apparatus 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components for executing the above display control methods for a display screen.

In some embodiments, there is also provided a non-temporary computer-readable storage medium including instructions, such as the memory 1504 including instructions. These instructions may be loaded and executed by the processor 1520 in the apparatus 1500 for executing the above methods. For example, the non-transitory computer readable storage medium may be a ROM, a random-access memory (RAM), a compact disc read-only memory (CD-ROM), a magnetic tape, a floppy disk, an optical data storage device or the like.

There is also provided a non-temporary computer-readable storage medium. When the instructions in the storage medium are executed by the processor of the apparatus 1500, the apparatus 1500 can be caused to execute the above display control methods for a display screen.

In some embodiments, a display control method of a display screen is provided, wherein the method is applied to a mobile terminal having a foldable display screen, the display screen includes n display regions, n is a positive integer of not less than 2, and the method includes:

identifying multimedia elements currently displayed in a first display region;

filtering the identified multimedia elements to obtain a target multimedia element; and displaying the target multimedia element in a second display region.

In some embodiments, n is 3 and the method further includes:

displaying, when a first content viewing instruction for a first multimedia element is received in the second display region, the first multimedia element in the first display region, wherein the first multimedia element is any multimedia element displayed in the second display region; and displaying a multimedia element, which is currently displayed in the first display region, in a third display region.

In some embodiments, n is 3 and the method further includes:

displaying, when a second content viewing instruction for a second multimedia element is received in a third display region, the second multimedia element in the first display region, wherein the second multimedia element is any multimedia element displayed in the third display region; and displaying a multimedia element, which is currently displayed in the first display region, in a third display region.

In some embodiments, the filtering the identified multimedia elements to obtain the target multimedia element includes:

determining a type of each of the identified multimedia elements; and classifying, when a type of a third multimedia element is a target type, the third multimedia element as the target multimedia element, wherein the third multimedia element is any of the identified multimedia elements.

In some embodiments, the filtering the identified multimedia elements to obtain the target multimedia element includes:

acquiring user preference information; and filtering the identified multimedia elements according to the user preference information to obtain the target multimedia element.

In some embodiments, the method further includes:

performing, in response to a target-triggering operation acquired in the first display region, the steps of identifying multimedia elements currently displayed in the first display region, filtering the identified multimedia elements, and displaying a target multimedia element obtained by the filtering in the second display region.

In some embodiments, a second aspect of the present disclosure, a display control apparatus of a display screen is provided, wherein the apparatus is applied to a mobile terminal having a foldable display screen, the display screen includes n display regions, n is a positive integer of not less than 2, and the apparatus includes:

an identifying module configured to identify multimedia elements currently displayed in a first display region;

a filtering module configured to filter the identified multimedia elements to obtain a target multimedia element; and a displaying module configured to display the target multimedia element in a second display region.

In some embodiments, n is 3 and the displaying module is further configured to: display, when a first content viewing instruction for a first multimedia element is received in the second display region, the first multimedia element in the first display region, wherein the first multimedia element is any multimedia element displayed in the second display region; and display a multimedia element, which is currently displayed in the first display region, in a third display region.

In some embodiments, n is 3 and the displaying module is further configured to: display, when a second content viewing instruction for a second multimedia element is received in a third display region, the second multimedia element in the first display region, wherein the second multimedia element is any multimedia element displayed in the third display region; and display a multimedia element, which is currently displayed in the first display region, in a third display region.

In some embodiments, the filtering module is further configured to: determine a type of each of the identified multimedia elements; and classify, when a type of a third multimedia element is a target type, the third multimedia element as the target multimedia element, wherein the third multimedia element is any of the identified multimedia elements.

In some embodiments, the filtering module is further configured to: acquire user preference information, and filter the identified multimedia elements according to the user preference information to obtain the target multimedia element.

In some embodiments, the identifying module is further configured to: perform, in response to a target-triggering operation acquired in the first display region, the step of identifying multimedia elements currently displayed in the first display region.

In some embodiments, a display control apparatus of a display screen is provided, wherein the apparatus is applied to a mobile terminal having a foldable display screen, the display screen including n display regions, n is a positive integer of not less than 2, and the apparatus includes:

a processor; and a memory for storing a processor-executable instruction, wherein the processor is configured to: identify multimedia elements currently displayed in a first display region; filter the identified multimedia elements to obtain a target multimedia element; and display the target multimedia element in a second display region.

In some embodiments, a storage medium having stored therein a computer program instruction is provided, which, when being executed by a processor, implements the display control method of the display screen of the above embodiments.

In the embodiments of the present disclosure, through effective display control on the n display regions of the display screen, the multimedia elements can be flexibly displayed among the n display regions. As such, the various display regions of the mobile terminal are effectively used and a brand-new display control on a novel display screen is achieved, which can assist users in using the mobile terminal more conveniently and bring great convenience and new experience to the users.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A display control method of a display screen, wherein the method is applied to a mobile terminal having a foldable display screen, the display screen comprises n display regions, n is 3, and the method comprises:
   identifying multimedia elements currently displayed in a first display region;
   filtering the identified multimedia elements to obtain a target multimedia element;
   displaying the target multimedia element in a second display region; and
   in response to a content viewing instruction for a first multimedia element received in the second display region, displaying a multimedia element, which is currently displayed in the first display region, in a third display region; and displaying content of the first multimedia element in the first display region, wherein the first multimedia element is any multimedia element displayed in the second display region.

2. The method according to claim 1, wherein the method further comprises:
   in response to a content viewing instruction for a second multimedia element received in a third display region, displaying a multimedia element, which is currently displayed in the first display region, in a third display region; and displaying content of the second multimedia element in the first display region, wherein the second multimedia element is any multimedia element displayed in the third display region.

3. The method according to claim 1, wherein the filtering the identified multimedia elements to obtain the target multimedia element comprises:
   determining a type of each of the identified multimedia elements; and
   classifying, when a type of a certain multimedia element is a target type, the certain multimedia element as the target multimedia element, wherein the certain multimedia element is any of the identified multimedia elements.

4. The method according to claim 1, wherein the filtering the identified multimedia elements to obtain the target multimedia element comprises:
   acquiring user preference information; and
   filtering the identified multimedia elements according to the user preference information to obtain the target multimedia element.

5. The method according to claim 1, further comprising:
   performing, in response to a target-triggering operation acquired in the first display region, the steps of identifying multimedia elements currently displayed in the first display region, filtering the identified multimedia elements, and displaying a target multimedia element obtained by the filtering in the second display region.

6. A mobile terminal implementing the method of claim 1, comprising the foldable display screen, wherein the foldable display screen comprises an organic light-emitting diode (OLED) touch screen.

7. The mobile terminal of claim 6, further comprising a camera and a flash light, wherein the foldable display screen is configured to be folded outwards, and the camera and the flashlight are disposed in one of the first display area and the second display area facing away from a user; and wherein the mobile terminal is configured to automatically determine an identification range according to a touch control operation executed by the user in the first display region.

8. A display control apparatus of a display screen, wherein the apparatus is applied to a mobile terminal having a foldable display screen, the display screen comprising n display regions, n is 3, and the apparatus comprises:
   a processor; and
   memory storing instructions for execution by the processor to:
   identify multimedia elements currently displayed in a first display region;
   filter the identified multimedia elements to obtain a target multimedia element;
   display the target multimedia element in a second display region; and
   in response to a content viewing instruction for a first multimedia element received in the second display region, display a multimedia element, which is currently displayed in the first display region, in a third display region; and display content of the first multimedia element in the first display region, wherein the first multimedia element is any multimedia element displayed in the second display region.

9. The apparatus according to claim 8, wherein the processor is further configured to:
   in response to a content viewing instruction for a second multimedia element received in a third display region, display a multimedia element, which is currently displayed in the first display region, in a third display region; and display content of the second multimedia element in the first display region, wherein the second multimedia element is any multimedia element displayed in the third display region.

10. The apparatus according to claim 8, wherein the filtering the identified multimedia elements to obtain the target multimedia element comprises:
    determining a type of each of the identified multimedia elements; and
    classifying, when a type of a certain multimedia element is a target type, the certain multimedia element as the target multimedia element, wherein the certain multimedia element is any of the identified multimedia elements.

11. The apparatus according to claim 8, wherein the filtering the identified multimedia elements to obtain the target multimedia element comprises:
    acquiring user preference information; and
    filtering the identified multimedia elements according to the user preference information to obtain the target multimedia element.

12. The apparatus according to claim 8, wherein the processor is further configured to:
    perform, in response to a target-triggering operation acquired in the first display region, the steps of identifying multimedia elements currently displayed in the first display region, filtering the identified multimedia elements, and displaying a target multimedia element obtained by the filtering in the second display region.

13. A non-transitory computer-readable storage medium having stored therein a computer program instruction, which, when being executed by a processor, implements a display control method of the display screen, wherein the method is applied to a mobile terminal having a foldable display screen, the display screen comprises n display regions, n is 3, and the computer program instruction is configured to:
    identify multimedia elements currently displayed in a first display region;

filter the identified multimedia elements to obtain a target multimedia element;

display the target multimedia element in a second display region; and in response to a content viewing instruction for a first multimedia element received in the second display region, display a multimedia element, which is currently displayed in the first display region, in a third display region; and display content of the first multimedia element in the first display region, wherein the first multimedia element is any multimedia element displayed in the second display region.

14. The non-transitory computer-readable storage medium according to claim 13, wherein the computer program instruction is further configured to:

in response to a content viewing instruction for a second multimedia element received in a third display region, display a multimedia element, which is currently displayed in the first display region, in a third display region; and display content of the second multimedia element in the first display region, wherein the second multimedia element is any multimedia element displayed in the third display region.

15. The non-transitory computer-readable storage medium according to claim 13, wherein the filtering the identified multimedia elements to obtain the target multimedia element comprises:

determining a type of each of the identified multimedia elements; and classifying, when a type of a certain multimedia element is a target type, the certain multimedia element as the target multimedia element, wherein the certain multimedia element is any of the identified multimedia elements.

16. The non-transitory computer-readable storage medium according to claim 13, wherein the filtering the identified multimedia elements to obtain the target multimedia element comprises:

acquiring user preference information; and filtering the identified multimedia elements according to the user preference information to obtain the target multimedia element.

17. The non-transitory computer-readable storage medium according to claim 13, wherein the computer program instruction is further configured to:

perform, in response to a target-triggering operation acquired in the first display region, the steps of identifying multimedia elements currently displayed in the first display region, filtering the identified multimedia elements, and displaying a target multimedia element obtained by the filtering in the second display region.

* * * * *